United States Patent
Asen

(10) Patent No.: US 9,546,702 B2
(45) Date of Patent: Jan. 17, 2017

(54) DISC BRAKE FOR A COMMERCIAL VEHICLE

(71) Applicant: KNORR-BREMSE Systeme fuer Nutzfahrzeuge GmbH, Munich (DE)

(72) Inventor: Alexander Asen, Eichendorf (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 32 days.

(21) Appl. No.: 14/657,241

(22) Filed: Mar. 13, 2015

(65) Prior Publication Data

US 2015/0184709 A1 Jul. 2, 2015

Related U.S. Application Data

(63) Continuation of application No. PCT/EP2013/068552, filed on Sep. 9, 2013.

(30) Foreign Application Priority Data

Sep. 13, 2012 (DE) ........................ 10 2012 108 575

(51) Int. Cl.
| | |
|---|---|
| *F16D 65/00* | (2006.01) |
| *F16D 55/02* | (2006.01) |
| *F16D 55/225* | (2006.01) |
| *F16D 55/00* | (2006.01) |

(52) U.S. Cl.
CPC ........... *F16D 65/0068* (2013.01); *F16D 55/02* (2013.01); *F16D 55/225* (2013.01); *F16D 2055/002* (2013.01); *F16D 2055/0016* (2013.01); *F16D 2055/0037* (2013.01); *F16D 2250/0084* (2013.01)

(58) Field of Classification Search
CPC ...... F16D 65/068; F16D 55/02; F16D 55/225; F16D 2055/016; F16D 2055/002; F16D 2055/0037; F16D 2250/0084
USPC ............ 188/18 A, 73.31, 73.32, 73.1, 206 R
See application file for complete search history.

(56) References Cited

U.S. PATENT DOCUMENTS

| | | | |
|---|---|---|---|
| 2009/0014262 A1* | 1/2009 | Camilo-Martinez | F16D 65/092 188/2 R |
| 2009/0020375 A1 | 1/2009 | Haertl et al. | |

FOREIGN PATENT DOCUMENTS

| | | |
|---|---|---|
| DE | 198 55 614 C1 | 7/2000 |
| DE | 10 2010 032 517 A1 | 2/2012 |
| DE | 10 2011 111 113 A1 | 2/2013 |
| EP | 1 942 286 A1 | 7/2008 |
| EP | 1 942 286 B1 | 12/2009 |

(Continued)

OTHER PUBLICATIONS

International Search Report dated Dec. 3, 2013 with English translation (six (6) pages).

(Continued)

*Primary Examiner* — Melanie Torres Williams
(74) *Attorney, Agent, or Firm* — Crowell & Moring LLP

(57) ABSTRACT

A disc brake for a commercial vehicle, includes a brake caliper having a receiving space for functional elements, a mounting and functional opening of the receiving space being closed by a closure plate through which at least one adjusting spindle extends. The closure plate is fastened to the brake caliper so that it can be non-destructively detached. The closure plate, in a first sub-region, is screwed to the brake caliper and, in a second sub-region, is interlockingly held on the brake caliper.

10 Claims, 2 Drawing Sheets

(56) References Cited

FOREIGN PATENT DOCUMENTS

EP 2 412 997 B1 6/2013
WO WO 2007/085439 A1 8/2007

OTHER PUBLICATIONS

German Office Action dated Jun. 7, 2013 (six (6) pages).
German-language Written Opinion (PCT/ISA/237) dated Dec. 3, 2013, including English translation (nine (9) pages).
International Preliminary Report on Patentability (PCT/IB/373) dated Mar. 26, 2015 with English translation, including English translation of document C3 (German-language Written Opinion (PCT/ISA/237)) previously filed on Mar. 13, 2015 (12 pages).

* cited by examiner

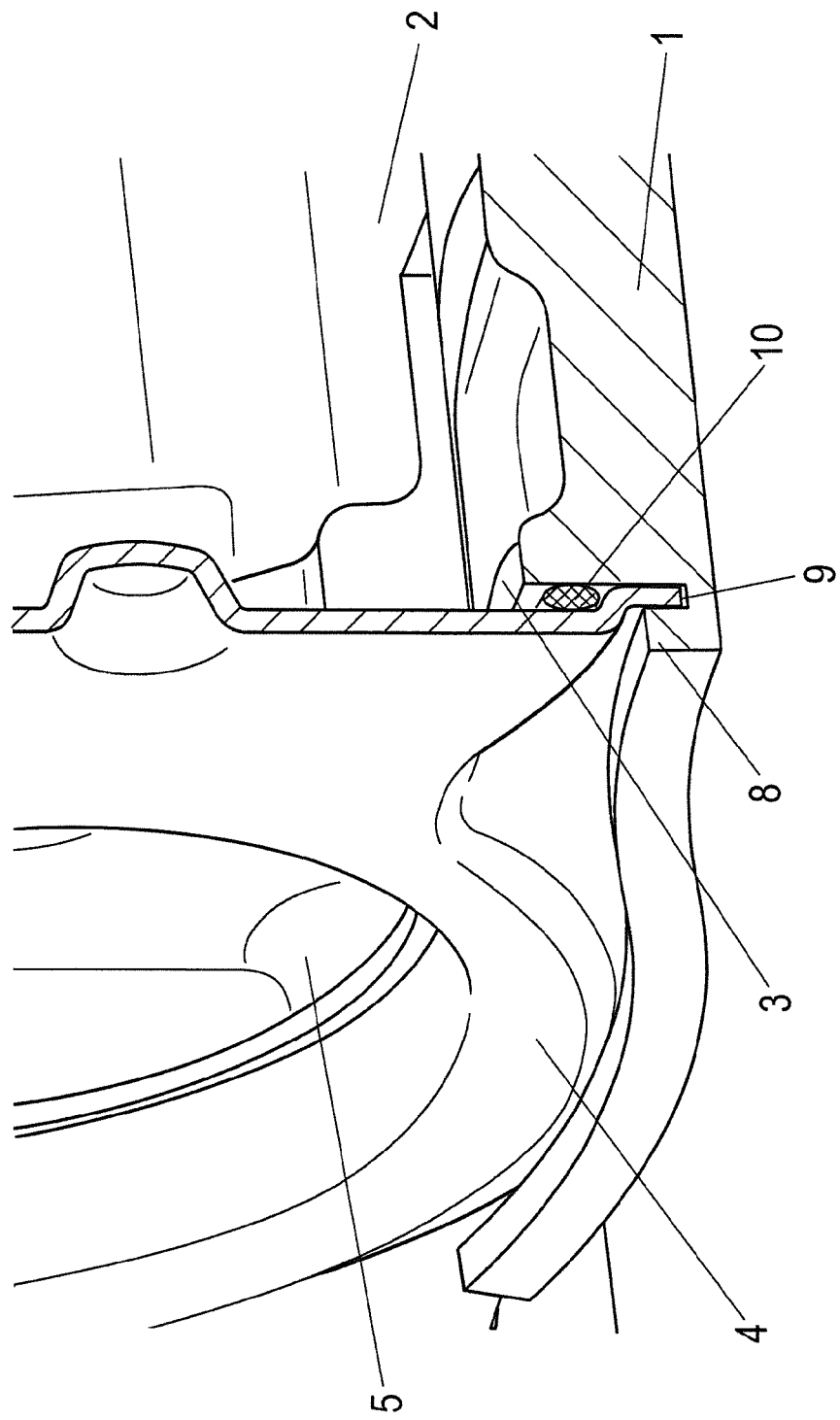

DISC BRAKE FOR A COMMERCIAL VEHICLE

CROSS REFERENCE TO RELATED APPLICATIONS

This application is a continuation of PCT International Application No. PCT/EP2013/068552, filed Sep. 9, 2013, which claims priority under 35 U.S.C. §119 from German Patent Application No. 10 2012 108 575.7, filed Sep. 13, 2012, the entire disclosures of which are herein expressly incorporated by reference.

BACKGROUND AND SUMMARY OF THE INVENTION

The invention relates to a disc brake for a commercial vehicle having a brake caliper which has a receiving space for functional parts. A mounting and functional opening of the receiving space is closed by way of a closure plate which is penetrated by at least one actuating spindle of a brake application unit.

In a disc brake of this type, the brake caliper straddles a brake disc. Two brake pads are arranged in the caliper to be pressed functionally onto the brake disc. A receiving space is provided in the caliper, in which a brake application device with actuating spindles is positioned.

In order to protect the functional parts, a mounting and functional opening of the receiving space which faces the brake disc is closed by a closure plate which is penetrated by the actuating spindles. Otherwise, the closure plate serves as a support part of various attachment components, such as boots, seals and the like.

The fastening of the closure plate takes place by threaded fasteners, such as screws, which are arranged circumferentially in the edge region and are screwed into the brake caliper.

For effective sealing of the closure plate against the brake caliper, in order to prevent the penetration of moisture and dirt into the receiving space, the closure plate bears against the brake caliper in a sealed manner.

To this end, a sealing cord is provided which bears on one side circumferentially against the edge region of the closure plate and on the other side against a support face of the brake caliper. The seal, which is composed of an elastic material, is compressed during screwing on the closure plate to such an extent that a sufficient sealing action is achieved.

For the circumferential screw connection of the closure plate to the brake caliper, a corresponding number of threaded bores are to be made in the brake caliper, which is naturally possible only with corresponding, cost-increasing, manufacturing complexity.

Moreover, on account of the multiplicity of screws which are used, the mounting and dismantling of the closure plate, that is to say the tightening and releasing of the screws, becomes time-intensive and therefore likewise relatively expensive.

The known construction is therefore a barrier to the constant requirements for, first of all, inexpensive manufacturing, and secondly for inexpensive mounting and dismantling.

The invention is based on the object of developing a disc brake of the above-mentioned type such that it can be manufactured and mounted more simply and less expensively.

This and other objects are achieved by way of a disc brake for a commercial vehicle having a brake caliper which has a receiving space for functional parts. A mounting and functional opening of the receiving space is closed by way of a closure plate which is penetrated by at least one actuating spindle of a brake application unit. The closure plate is screwed in a first part region to the brake caliper and is held, in a second part region, on the brake caliper in a positively locking manner.

As a result of the partial interlocking connection (positively locking) of the closure plate to the brake caliper, the introduction of threaded bores into the brake caliper can be dispensed with in this region, which results in a considerable simplification during the machining of the brake caliper, with the resulting cost advantages.

Since a build-up of material on the caliper for introducing the threaded bores is also not required in this region, in principle the mounting opening can have a larger design, which naturally facilitates mounting work, by way of which functional parts are to be introduced into or removed from the receiving space.

Screws are provided in the remaining part region as was the case previously, which screws make it possible to release the closure plate from the brake caliper without destroying it. The result is that the closure plate can be reused, for example, after functional parts are repaired, with only a replacement of the seal.

According to one advantageous aspect, a longitudinal groove is provided in the lower edge region (that is to say, closer to the axis of the brake disc) of the mounting and functional openings in the brake caliper, into which longitudinal groove the closure plate, which is composed of sheet metal, can be inserted from above before the screw connection takes place.

Here, in the final position, the closure plate bears in a planar manner against the associated surface in the edge region of the mounting and functional opening, with sufficient contact pressure on the seal between the brake caliper and the closure plate.

Whereas the groove which is provided on the brake caliper for receiving an edge region of the closure plate is preferably continuous, to be precise substantially over the entire elongated length of the closure plate, there is certainly the possibility of dividing up the length of the groove into discrete sections. The result is that groove sections are produced, in which the closure plate lies. Reducing the length of the groove in this manner can lead to a reduction in the brake caliper weight and, therefore, helps achieve the constant requirement, in particular, for the purpose of saving fuel.

However, it has to be ensured here that the closure plate bears against the seal with sufficient contact pressure.

As mentioned, the plug-in profile, that is to say the groove, is provided on the lower edge region of the mounting opening on the brake caliper. Accordingly, the screw connection is arranged on the upper edge region relative to an imaginary longitudinal axis of the closure plate or the mounting and functional opening.

During mounting of the closure plate, it is first of all to be inserted (pushed) merely from above through an assembly opening of the brake caliper into the groove, whereupon subsequently the screw connection takes place. The seal, usually a sealing cord, has previously been attached to the closure cover.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a cross-section according to the line II-II in FIG. 1 in a perspective view.

DETAILED DESCRIPTION OF THE DRAWINGS

Figure 1:
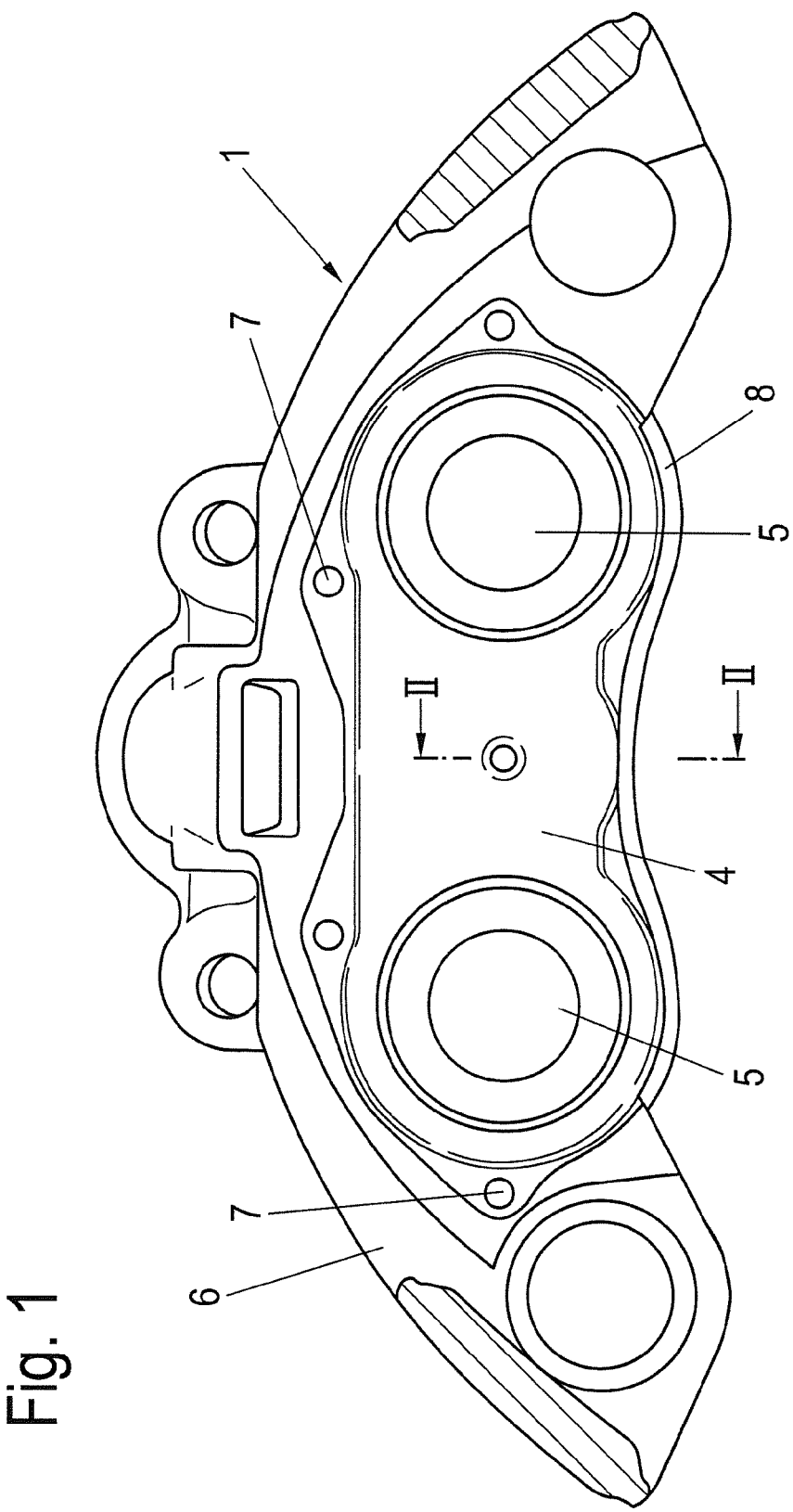
FIG. 1 shows a partial detail of a disc brake according to an embodiment of the invention in a sectioned front view.

The figures show a brake caliper 1 of a disc brake for a commercial (utility) vehicle, which brake caliper 1 has a receiving space 2 for functional parts (not shown) such as actuating spindles of a brake application device or the like. The receiving space 2 has a mounting and functional opening 3 which is closed by way of a closure plate 4. The closure plate 4 has passage openings 5 for the actuating spindles of the brake application device.

The closure plate 4 is fastened to the brake caliper 1 such that it can be released without being destroyed, to which end it is screwed to the brake caliper 1 in a first partial region (shown at the top of FIG. 1) with screws 7 and is held interlockingly in a positively locking manner on the brake caliper 1 in a second partial region (shown at the bottom of FIGS. 1 and 2).

To this end, the brake caliper 1 has a groove 9 in the lower edge region which faces away from an assembly opening 6. The groove 9 is associated with the mounting and functional opening 3. The groove 9 is delimited on the outside by way of a web 8. In the groove 9, an edge of the closure plate 4 is inserted, which edge is bent over toward the receiving space 2.

Otherwise, a seal 10, usually in the form of a sealing cord, is provided between the closure plate 4 and the brake caliper 1, by way of which seal 10 the receiving space 2 and the mounting and functional opening 3 are sealed hermetically.

The screws 7 are distributed uniformly in a manner known per se, to be precise on the upper edge side of the closure plate 4 which lies opposite the web 8 as far as the outermost extent on both sides.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, comprising:
a caliper having a receiving space for functional parts of the disc brake, the receiving space having an opening that faces a brake disc;
a closure plate configured to close the opening, the closure plate being penetratable by at least one actuating spindle;
wherein the closure plate is fastened to the brake caliper in a first partial region via threaded fasteners and is held on the brake caliper in a second partial region via an interlocking connection,
wherein an outer edge region of the closure plate and a groove in the caliper are oriented perpendicular to a brake disc axis and together form the interlocking connection.

2. The disc brake according to claim 1, wherein:
the groove extends in a longitudinal direction of the closure plate and is delimited on a side of the caliper facing the brake disc via a web, and
the edge region of the closure plate is inserted into the groove to form the interlocking connection.

3. The brake disc according to claim 2, wherein the groove is arranged on a lower side of the caliper relative to an assembly opening of the caliper.

4. The brake disc according to claim 1, wherein the groove is arranged on a lower side of the caliper relative to an assembly opening of the caliper.

5. The brake disc according to claim 2, wherein the groove is provided on an edge region of the caliper associated with the mounting and functional opening.

6. The disc brake according to claim 2, wherein the edge region of the closure plate is bent inward toward the receiving space and is inserted into the groove.

7. The disc brake according to claim 1, wherein the interlocking connection of the closure plate in the groove has substantially no play.

8. The disc brake according to claim 6, further comprising:
a circumferential seal arranged between the closure plate and the brake caliper in a region delimited by the inwardly bent edge region of the closure plate.

9. The disc brake according to claim 1, wherein:
the first partial region having the threaded fasteners is in an upper region facing the assembly opening of the brake caliper, and
two threaded fasteners are located on outermost edge regions relative to a longitudinal extent of the closure plate in the upper region.

10. A disc brake for a commercial vehicle, comprising:
a caliper having a receiving space for functional parts of the disc brake, the receiving space having an opening that faces a brake disc;
a closure plate configured to close the opening, the closure plate being penetratable by at least one actuating spindle;
wherein the closure plate is fastened to the brake caliper only in a first partial region at an upper side of the caliper via threaded fasteners and is held on the brake caliper in a second partial region at a lower side of the caliper via an interlocking connection,
whereby the closure plate is releasable from the caliper without destroying the closure plate.

* * * * *